July 7, 1936. W. J. ALLPHIN 2,046,863
MEANS FOR INDICATING STERILIZING TEMPERATURES
Filed March 19, 1934
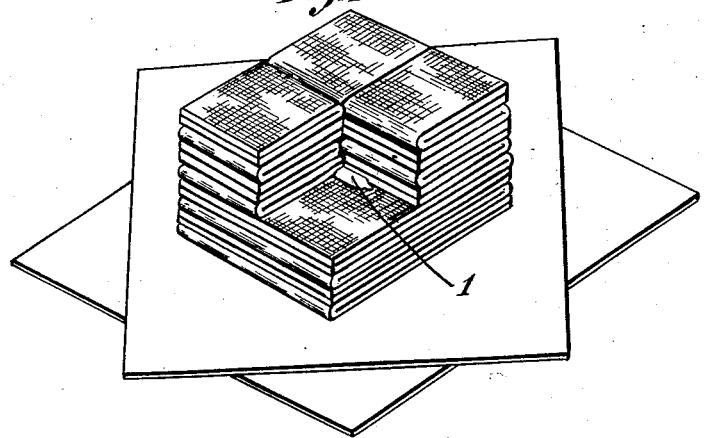
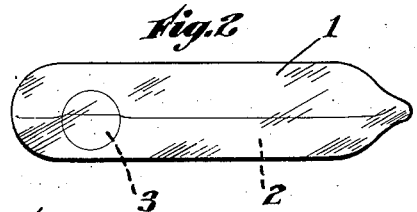 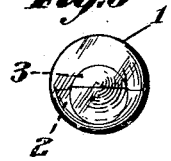
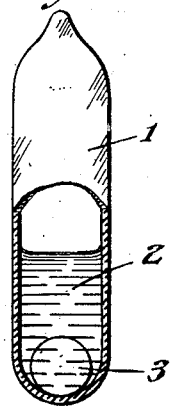 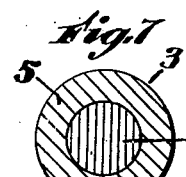 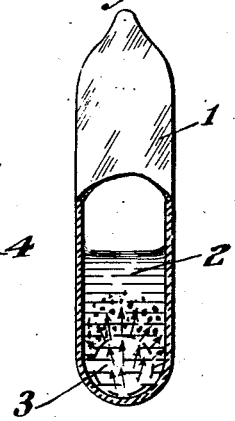
Inventor
Willard J. Allphin
By Ellis Speary
Attorney Patented July 7, 1936

2,046,863

UNITED STATES PATENT OFFICE 2,046,863

MEANS FOR INDICATING STERILIZING TEMPERATURES

Willard J. Allphin, Andover, Mass., assignor to MacGregor Instrument Company, Needham, Mass., a corporation of Massachusetts Application March 19, 1934, Serial No. 716,263

16 Claims. (Cl. 73—32)

This invention relates to means for indicating a state of sterility, particularly in hospital supplies for operating room purposes.

The necessity for a sterile condition in all dressings, sheets, sponges, gauze bandages and other items used in an operating room is recognized as of paramount importance. The practice is to deliver to the operating room a package of articles which are supposed to be perfectly sterile. The true condition of the bundle is verified by some sort of a temperature indicator which the nurse removes and by which the surgeon in charge is assured whether or not the articles are sterile.

Numerous types of indicators have been used, including a paper which changed color on the application of heat, and paper so treated as to display certain words or letters. Also, liquids which passed through a series of color changes according to prevailing temperatures and finally reached a color indicative of the sterile condition. Metals or chemicals which suffered changes in properties as a result of temperatures also have been used.

Indicators subject to premature changes and mere changes in color or color intensities when relied on as an indication are too largely dependent on the vision and color sense of the observer. The color changes usually consisted of the difference between lilac, violet and blue, or gray and black, simply a shading of one into the other, and this could not be definitely determined by most persons. Heretofore, so far as I am aware, there has been no clean cut basis of color that would give immediate definite assurance as to sterility and a lack of the same.

According to my present concept I propose to employ "color" or its absence to show the inspector that the goods are or are not sterile, but do not rely on the appearance of color or shades of color to show the condition of sterility. In my indicator in accordance with my invention there is preferably no color present prior to the time and temperature of sterilization which indicates definitely that the articles have not been sufficiently sterilized. When color is present at all it shows that the articles have been subjected to sterilizing temperatures to produce a sterile state. No particular color need be used, as either the absence or presence of color indicates the condition present. In fact, the word "color" as used herein means any change in appearance which may be promptly and accurately noted by the eye.

In the drawing I have illustrated and in the specification will describe an illustrative form of my invention which has proven successful in practical use. In the drawing:

Fig. 1 is a view of such an indicator positioned in a bundle of sheets and pillow cases, the outer wrapper being shown unfolded.

Fig. 2 is a side view of my indicator before being subjected to sterilizing temperatures.

Fig. 3 is an end view of the same.

Fig. 4 is such an indicator partly sectioned to show its condition prior to the moment of complete sterilization.

Fig. 5 an indication of its appearance after subjection to such temperature.

Fig. 6 is a side elevation of the indicator indicating its appearance after the pigment has been dispersed, and Fig. 7 is a sectional view of the pellet showing core and coating.

Such indicators comprise a sealed container 1 in which is confined glycerine or other inert liquid 2 in amount sufficient to coat entirely the inner wall of the container and to cushion the pellet 3. The container may be made of any transparent material and preferably is made up from glass tubing or small blown or moulded container walls which can be easily sealed off after receiving its contents. They are preferably of elongated form and can be placed in any position in the bundle of articles to be sterilized.

In the glycerine or other liquid I place a preferably spherical pellet or tablet 3. This comprises a core 4 of any selected color or pigment and a coating 5 of any suitable material which will hold coherent form to the desired temperature of sterilization. That is to say, the coating is of such nature that the given temperature to produce the state of sterility in the articles will be that required to soften or release the coating. Obviously, there may be numerous materials or substances which might be so employed, but in practice I have found that flowers of sulphur gives satisfactory results but acetanilide, resorcinol, paranitrophenol, paranitrodiphenyl, metanitraniline, meta-toluic acid and orthophenyl-benzoic acid may be used. I have found that the so-called soap dyes sold by the retail trade for home use are satisfactory, due to the ease of shaping and the relatively high moisture content, but any dye, pigment or other material which will become visible and conspicuous when the coating or encasement is released may be used.

When the sulphur or other coating has softened under the sterilizing heat the core of dye expands and instantly spreads throughout the glycerine or other liquid dispersent within the container, producing to all appearances a colored vial. This color informs the inspector that the linens have been subjected to proper temperatures for a sufficient period to produce the desired sterile condition in the same.

The glycerine or other liquid provides a cushion for the pellet 3 which prevents the same from shock against the glass container and so becoming broken during use or transportation. Instead of glycerine, monoethylene glycol, diethylene glycol or triethylene glycol may be used.

It will be understood that a coating must be provided for the core 4 of pigment or dye which will not dissolve or react with the liquid medium employed or free the dye until subjected to the proper temperature. For example, 250° F. is recognized as a proper sterilizing temperature and the sulphur coating softens and releases the dye of the pellet at that temperature. The glycerine which coats all the vial takes up the color and insures that the same will be seen regardless of the position of the vial.

Sulphur, as well as other reasonably pure chemicals has a sharp melting point which can be relied upon usually within a range of one-tenth of a degree. By providing such a coating with a predetermined melting point the desired degree of temperature for sterilization will be accurately and sharply indicated.

The sudden disruption of the color pellet is characteristic and of great advantage. The change is apparently instantaneous and the glycerine receives the color uniformly and permanently. Moisture or volatile in the pigment of the core 4 seems to assist in producing the result but other factors of expansion or disruption may be used.

The coating need only be one which can be relied on as softening at exactly the temperatures required. While a coating which softened or became disrupted at temperatures above minimum sterilizing temperatures would be within the scope of my invention, it is desirable to use a coating which reacts as nearly as possible at the critical moment. This I have found sulphur and like pure coatings will do.

Obviously other modifications as to color, coating, medium or container may be made without departing from the spirit of my invention if within the limits of the appended claims.

What I therefore claim and desire to secure by Letters Patent is:—

1. In a sterilizing temperature indicator, a transparent container, a liquid medium therein, a pellet comprising a core of soluble coloring matter and a coating therefor inert to the liquid and having a physical tendency to disintegrate at sterilizing temperatures whereupon said coloring matter is released and becomes dispersed throughout said liquid.

2. In a sterilizing temperature indicator, a transparent container, a body of glycerine therein, a pellet comprising a core of coloring matter dispersible in this glycerine and a coating therefor having a physical tendency to disintegrate at sterilizing temperatures whereupon said coloring matter is released and becomes dispersed throughout said glycerine.

3. A sterilizing temperature indicator comprising a pellet having a core of color, a coating therefor having a physical tendency to disintegrate at sterilizing temperatures, a dispersion medium for said core when released by said coating, and a transparent container for said medium.

4. A pellet for use as a sterilizing temperature indicator having a core of color and a coating of sulphur.

5. A pellet for use as a sterilizing temperature indicator having a core of color and a coating which has a physical tendency to disintegrate at sterilizing temperaturs to release the kernel color.

6. A pellet for use as a sterilizing temperature indicator having a core of coloring matter containing moisture and a coating which has a physical tendency to disintegrate at sterilizing temperatures to release the coloring matter.

7. A pellet for use as a sterilizing temperature indicator having a core of coloring matter containing matter volatilizable by heat, and a coating which has a physical tendency to disintegrate at sterilizing temperatures to release the coloring matter.

8. A sterilizing temperature indicator comprising a closed glass container, a dispersion medium therein, and a pellet in said container having a core of coloring matter containing moisture and an external coating having a physical tendency to disintegrate at a predetermined moment of sterilization whereby the pellet will be disrupted and the dye dispersed substantially instantly.

9. A sterilizing temperature indicator comprising a closed glass container, a dispersion medium therein having the property of wetting the glass, and a pellet in said container having a core of coloring matter containing moisture and an external coating having a physical tendency to disintegrate at a predetermined temperature of sterilization whereby the pellet will be disrupted and the coloring matter dispersed substantially instantly.

10. In a sterilizing temperature indicator, a transparent container, a suspension medium therein, a pellet comprising a core of soluble coloring matter and a coating impervious to the suspension medium therefor and having a physical tendency to disintegrate at sterilizing temperatures whereupon said coloring matter is released and becomes dispersed throughout said medium.

11. A sterilizing temperature indicator including a body of colored material and an envelopment completely covering said body with an investment tenaciously permanent at normal atmospheric temperatures but undergoing sudden physical disintegrative change at the critcial temperature predetermined for sterility to free the material enveloped by it.

12. A sterilizing temperature indicator including a body of colored material and an envelopment completely covering said body with an investment tenaciously permanent at normal atmospheric temperatures but undergoing sudden physical disintegrative change at the critical temperature predetermined for sterility to free the material enveloped by it, and a colorless extended dispersion medium receptively associated therewith and adapted to be colored by the material when it is freed from its investment, and a container for said dispersion medium.

13. As an indicator of predetermined exposure to heat, a freely dispersible body of coloring matter, an enclosing protective coating therefor, said coating having a point of thermal disintegrative susceptibility releasable of the coloring matter at the predetermined heat exposure, a liquid bath surrounding the enclosed coloring matter and comprising a solvent for the coloring matter but not disintegrative of the protective coating, said coating preventing release of the coloring matter to said solvent until subject to the predetermined heat exposure whereupon the coloring matter is released and the solvent colored thereby and a container for said liquid bath.

14. As an indicator of predetermined heat exposure, a freely dispersible body of coloring matter, a dispersion medium for said color, a transparent container for said medium, means for preventing dispersion of said coloring matter in said medium until after said predetermined heat exposure and thereupon instantaneously releasing said coloring matter to said dispersion medium.

15. As an indicator of predetermined heat exposure, a body of free coloring matter, an enclosure therefor preventing release subject to said predetermined heat exposure, and thereupon instantaneously releasing said coloring matter.

16. As an indicator of predetermined exposure to heat, a transparent container, a liquid medium therein, a pellet comprising a core of soluble coloring matter and a coating therefor inert to the liquid, said pellet disintegrating at sterilizing temperatures to release the coloring matter for dispersion throughout said liquid whereby the indicator throughout gives positive visual indication of such sterilizing temperature.

WILLARD J. ALLPHIN.